Oct. 28, 1958 D. T. HOFER 2,858,033
SILO UNLOADER
Filed March 29, 1954 4 Sheets-Sheet 1

David T. Hofer
INVENTOR.

BY *Clarence A. O'Brien*
*and Harvey B. Jacobson*
Attorneys

Oct. 28, 1958  
D. T. HOFER  
2,858,033  
SILO UNLOADER  
Filed March 29, 1954  
4 Sheets-Sheet 2

David T. Hofer  
INVENTOR.

BY *Clarence A. O'Brien*  
and *Harvey B. Jacobson*  
Attorneys

Oct. 28, 1958
D. T. HOFER
2,858,033
SILO UNLOADER
Filed March 29, 1954
4 Sheets—Sheet 3
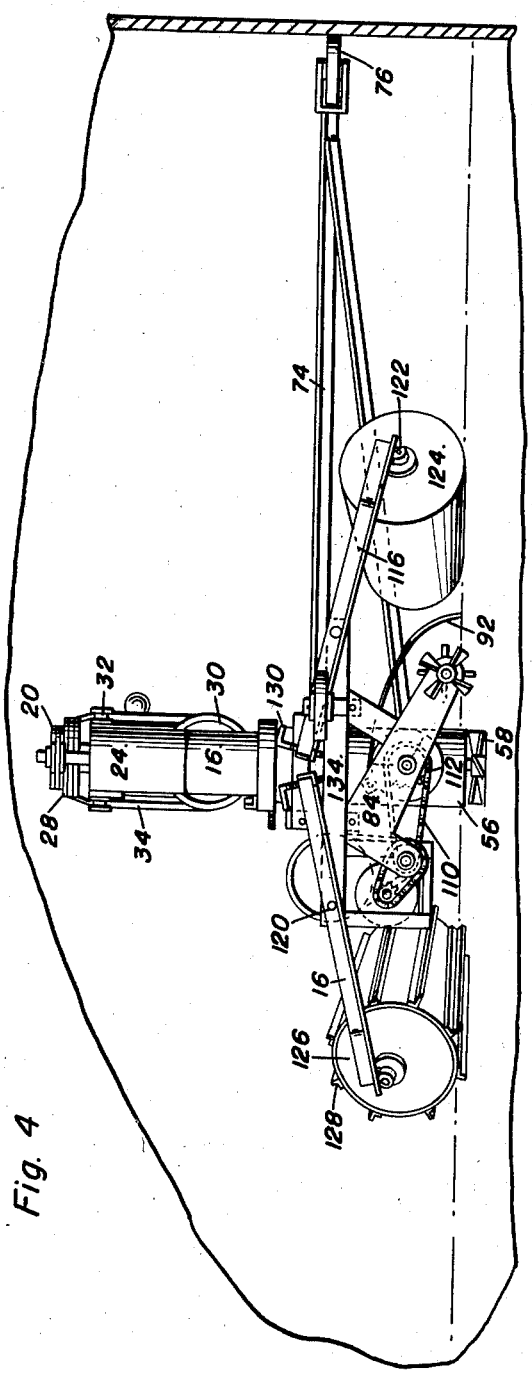
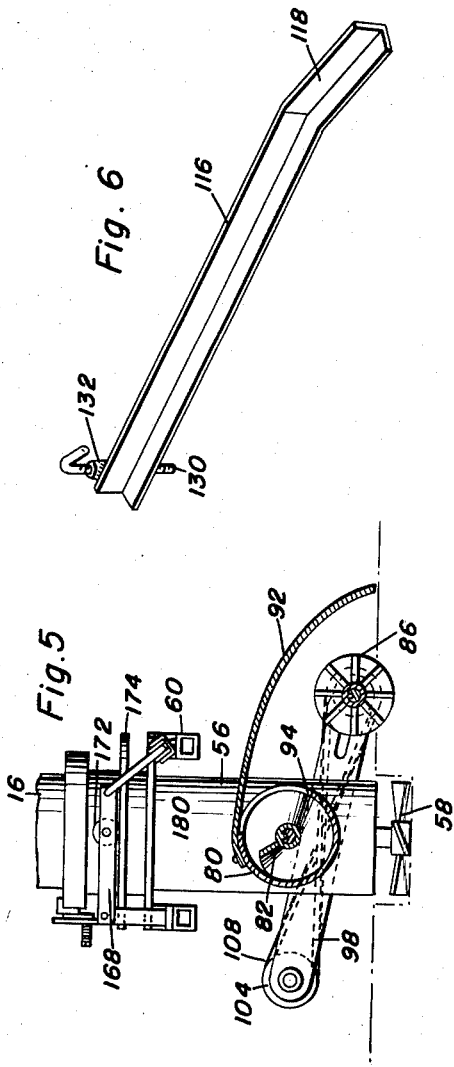
David T. Hofer
INVENTOR.
BY *Clarence A. O'Brien*
and *Harvey B. Jacobson*
Attorneys Oct. 28, 1958  D. T. HOFER  2,858,033
SILO UNLOADER
Filed March 29, 1954  4 Sheets-Sheet 4
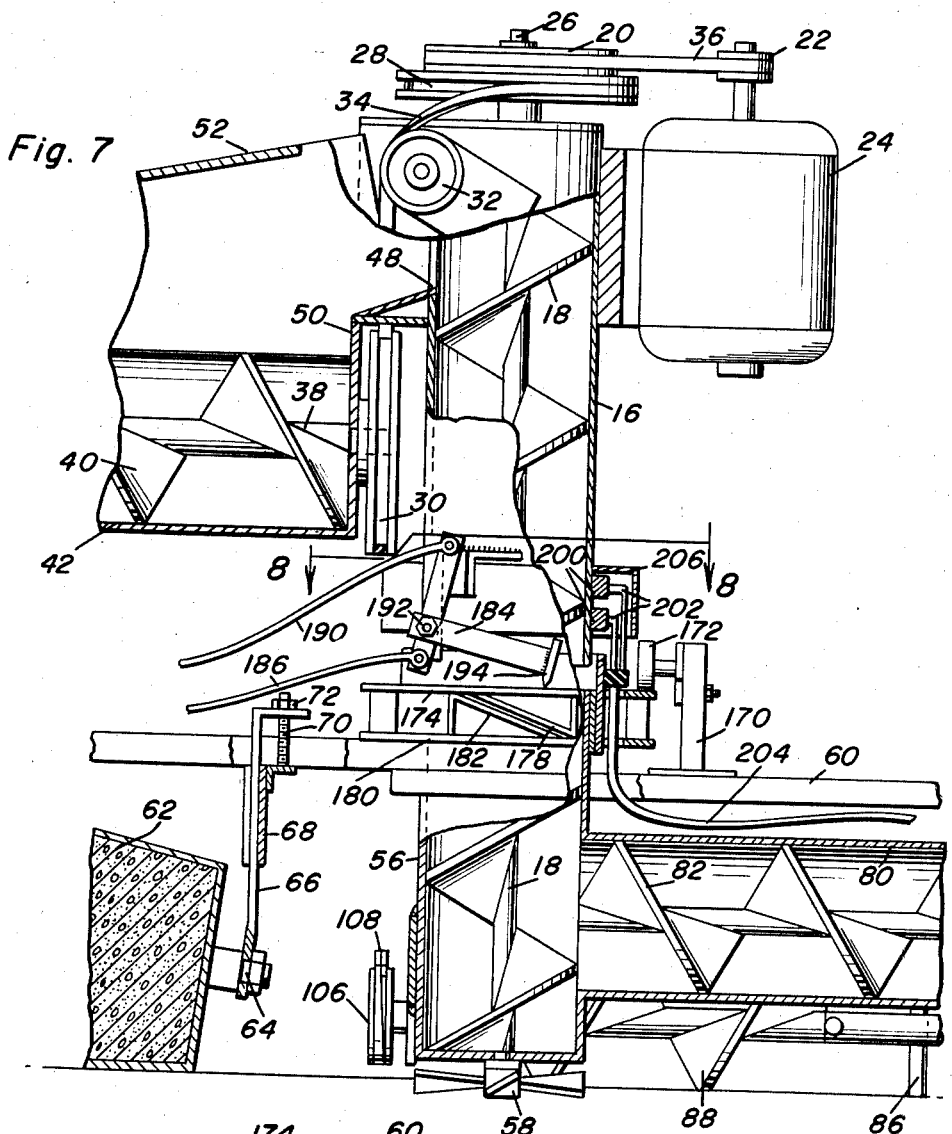
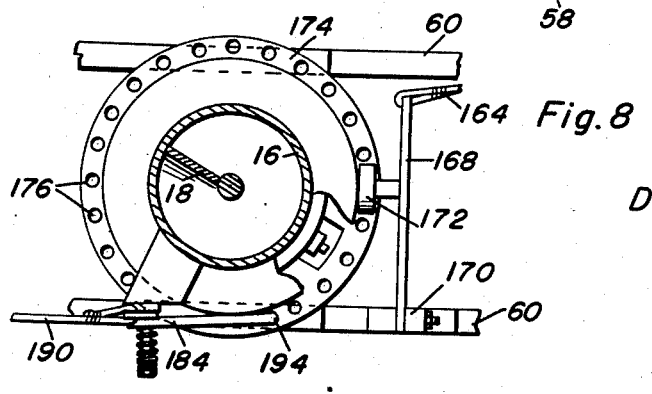
David T. Hofer
INVENTOR.

United States Patent Office 2,858,033
Patented Oct. 28, 1958

2,858,033

SILO UNLOADER

David T. Hofer, Huron, S. Dak.

Application March 29, 1954, Serial No. 419,488

4 Claims. (Cl. 214—17)

This invention relates to a silo unloader, and more specifically provides a device for loosening silage on the upper surface in a silo and transporting the silage to the center of the silo and then upwardly and outwardly through a suitable conveyor, to the usual chute opening in the side of the silo.

The removal of ensilage from a vertical silo has been one of the great time consuming chores on a farm. It has been the necessary task of a farm operator to climb the tedious and dangerous ladder which is usually connected to the outer surface of the wall of a silo. After climbing to the top of the silo, the farmer usually has to manually remove the ensilage with a pitchfork or shovel. Various mechanical devices have been designed with the apparent intention to overcome this problem, but until applicant's invention, no practical and inexpensive design had emerged. In order to provide an effective and inexpensive silo unloader, applicant has designed a novel mechanism which has for its prime object the removal of ensilage in an efficient, effective, and entirely mechanical manner.

An important object of this invention is to provide a silo unloader that is supported on the top surface of packed ensilage within the silo, said unloader including a wheel frame rotatable circumferentially within a cylindrical, vertical silo.

Another object is to provide a silo unloader having a wheel frame supporting a source of power which has connected therein drive means for rotating said wheel frame on the upper surface of a quantity of packed ensilage within the silo.

Still another object is to provide an unloading mechanism for unloading ensilage from a silo, said mechanism including an auger means to circumferentially rotate and remove ensilage from the top surface of an ensilage pile.

Still another important object of this invention is to provide an ensilage elevating mechanism including a stationary tubular member having a screw-type auger therein.

Yet another important feature of this invention is to provide a silo unloader having a rotatable frame with an auger conveyor mounted thereon for rotation circumferentially within the silo, a vertically arranged screw-type conveyor for elevating the ensilage and a horizontally arranged stationary screw-type conveyor for discharging the ensilage to the usual silo chute.

Still another object of this invention is to provide a silo unloader having a vertically arranged conveyor for elevating the silage wherein the central portion of the silage will be retained at a level equal to or below the level of the remainder of the silage within the silo thereby assuring constant feeding and clean operation of the silo unloader.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is an end elevation looking at the power roller or power wheel and the pick-up feeder and shield for the conveyor;

Figure 5 is a detailed section taken substantially along section line 5—5 of Figure 2 showing details of construction of the ensilage feeder or agitator and the conveyor for transporting the ensilage to the center of the silo;

Figure 6 is a detailed perspective view showing one of the mounting bars for the supporting rollers or wheels;

Figure 7 is a vertical section taken substantially along the center line of the central vertical conveyor, showing details of construction of the clutch mechanism and power supplying contact ring; and Figure 8 is a top plan section taken substantially along section line 8—8 of Figure 7 showing further details of construction of the clutch mechanism and the conveyor.

Figure 1:
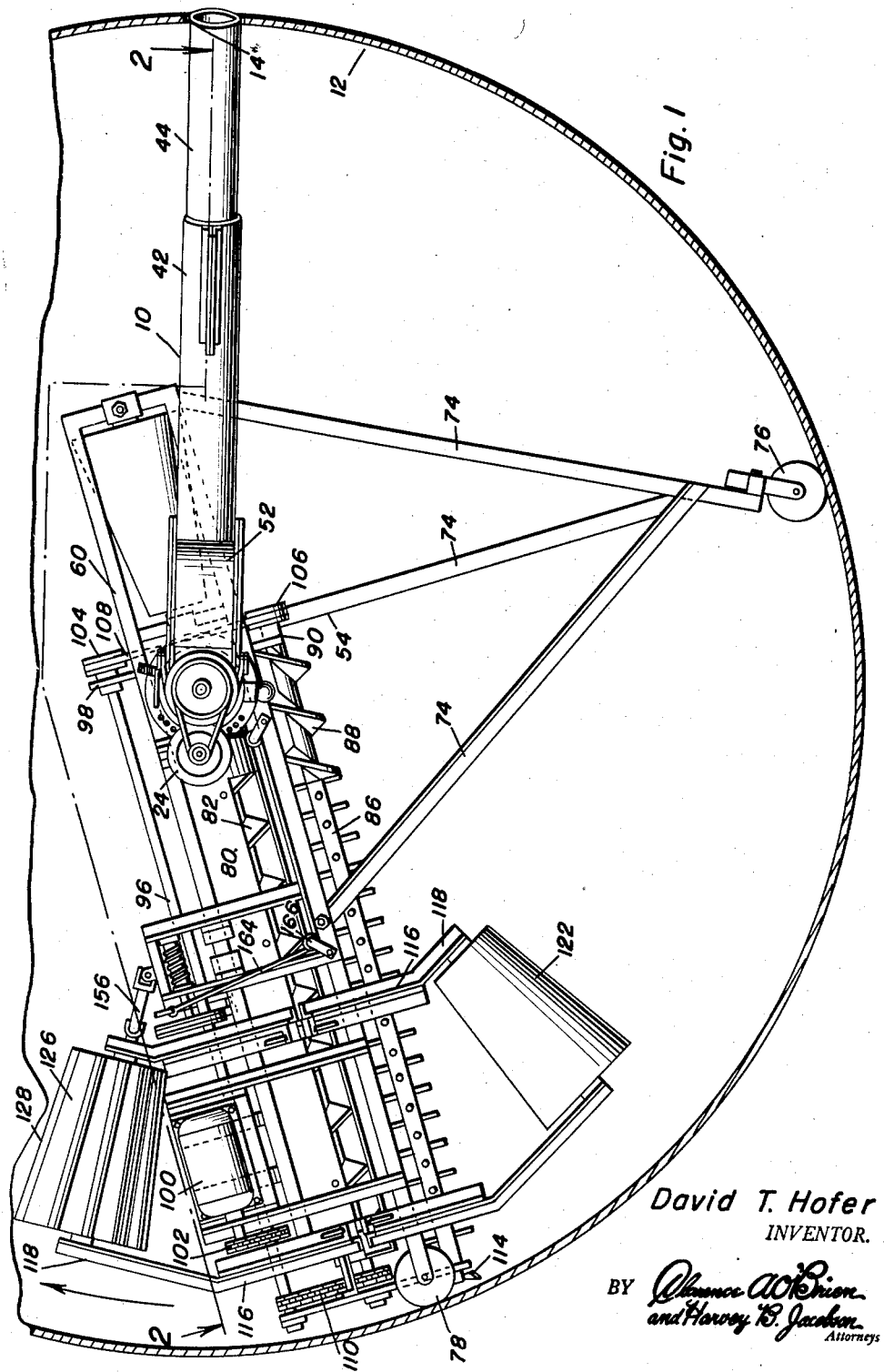
Figure 1 is a top plan view of the silo unloader of the present invention positioned in a silo.

Referring now specifically to the drawings, it will be seen that the silo unloader of the present invention is generally indicated by the numeral 10 and is positioned within the interior of a cylindrical silo 12 having the usual loading and unloading chute 14 therein. The stationary part of the silo unloader 10 includes a vertically extending tube 16 having an auger conveyor 18 rotatable therein and driven by a suitable belt pulley 20 in alignment with a pulley 22 driven by a suitable electric motor 24. The pulley 20 is secured to an extending shaft 26 which is an extension of the auger conveyor 18. A pulley 28 is secured to the shaft 26 and drives a pulley 30 which is at right angles to the pulley 28 and disposed therebelow by a pair of idler pulleys 32 which permit the V-belt 34 to turn at right angles in order to drive the pulley 30 from the pulley 28. It also will be seen that a V-belt 36 is provided for driving the pulley 20 from the motor 24 thereby driving the conveyor 18 and the pulley 30.

The pulley 30 is secured to an extension of a shaft 38 which drives an auger conveyor 40 positioned in a suitable elongated housing 42 which extends outwardly through the opening 14 in the silo 12. It will be seen that the outer end of the housing 42 is telescopically adjusted and indicated by the numeral 44 and the outer end of the conveyor 40 is journaled in a suitable bearing 46 for supporting the conveyor 40 within the housing 42. The upper end of the tubular member 16 is provided with an opening indicated by the numeral 48 and the upper end of the housing 42 is provided with an opening as indicated by the numeral 50 and a connecting chute or housing 52 is provided for guiding the material discharge from the upper end of the tubular member 16 into the inner end of the housing 42, thereby providing a continuity of passage for the material elevated by the auger conveyor 18 and discharged into the housing 42 wherein the auger 40 will discharge the material to the exterior of the silo 12. It will be seen that the motor 24 drives both the conveyor 18 and the conveyor 40 and suitable electrical controls may be provided for such motor.

Referring now specifically to the movable part of the silo unloader 10, it will be seen that the numeral 54 generally indicates a rotatable frame having a tubular member 56 which is in alignment with the tubular member 16 and receives the bottom portion of the auger conveyor 18. The tubular members 56 and 16 are so arranged to provide a continuity of passage therebetween. The bottom end of the conveyor 18 passes through the closed end of the tubular member 56 and terminates in a fan-like member 58 which digs the ensilage away from the central portion of the silo unloader 10 thereby assuring that the central portion of the silo unloader 10 will not be supported by the ensilage with a resultant inoperative machine. The frame 54 also includes a generally rectangular frame member 60 rigidly secured to the central tubular member 56 and extending to both sides thereof. To one side of the tubular member 56 is provided an elongated roller 62 having an inwardly tapering shape with an axle 64 projecting from each end thereof and journaled in a supporting bracket 66 which is telescopically received in a socket 68 and adjusted by a screw threaded member 70 passing through a portion of the bracket 66 and engaged by a suitable nut 72. Each end of the tapered roller or wheel is mounted in identical manner thereby permitting vertical adjustment of the frame 54. A plurality of braces 74 are secured rigidly to the frame 60 and adjustably support a wheel 76 at the outer end thereof for engaging the inner periphery of the silo 12. Also, it will be seen that the extreme end of the frame 60 is provided with a guide wheel 78 similar to the guide wheel 76 for also engaging the inner periphery of the silo 12 thereby guiding the rotational movement of the frame 60 about an axis formed by the center line of the vertical screw or auger conveyor 18.

Referring now specifically to Figure 1 and other figures supplementing this figure, it will be seen that the elongated side of the frame disposed at one side of the tubular member 16 comprises the actual ensilage conveying means for moving the ensilage into the center conveyor 18 for movement upwardly through the tubular member 16 and into the discharge housing 42. This structure includes an elongated tubular housing 80 disposed horizontally and rigidily secured to the tubular member 56 and in communication therewith and having a screw auger 82 disposed therein and journaled in suitable bearings formed by an outer plate 84. A beater 86 having a screw conveyor 88 at its inner end is journaled in suitable brackets 90 at its inner end and the plate 84 at its outer end. A guide shield 92 is secured to the housing 80 at one end and extends over the beater 86 for guiding the ensilage into the opening 94 of the housing 80. An elongated drive shaft 96 is journaled at its inner end on a bracket 98 and at its outer end on the plate 84. This shaft 96 is driven by an electric motor 100 having a suitable sprocket chain 102 engaging suitable pulleys on the motor drive shaft and the drive shaft 96 for driving the shaft 96 in an obvious manner. The inner end of the drive shaft 96 is provided with a pulley 104 for driving a pulley 106 positioned on the inner end of the beater 86 through the utility of a V-belt 108. The outer end of the drive shaft 96 is provided with a suitable sprocket gear driving a sprocket chain 110 for driving a sprocket gear 112 on the end of the screw auger conveyor 82. It will be seen that by actuation of the electric motor 100, the shaft 96, the auger 82 and the beater 86 are all rotated. Further, it will be seen that the silage agitator 114 is provided on the outer end of the beater 86 for assuring the removal of the silage close adjacent the inner periphery of the silo 12.

Referring now specifically to Figures 1 and 4, it will be seen that a pair of angle irons 116 having angularly extending ends 118 are pivotally connected to the frame member 60 by suitable pivot bolts 120. The outer end of the angle iron members 118 pivotally receive axles 122 of a roller 124 having a smooth surface and a roller 126 having projecting ribs 128 along the outer surface thereof. Each of the rollers 124 and 126 are tapered inwardly in the same manner as roller 62 thereby tending to rotate the frame 54 about a center formed by the tubular member 16. The inner ends of the angle iron members 116 are provided with a screw threaded member 130 extending through a suitable internally threaded member 132 and engaging cross pieces 134 secured to the frame 60 for adjusting the angular relation of the angle iron members 116 and the frame 60 thereby raising and lowering the frame 60 a vertically adjusted height as desired. It will be seen that the roller 126 with the longitudinal ribs 128 thereon is used as a traction roller and provides the driving traction for rotating the frame indicated by the numeral 54 about the center formed by the vertical stationary tube 16.

Figure 2:
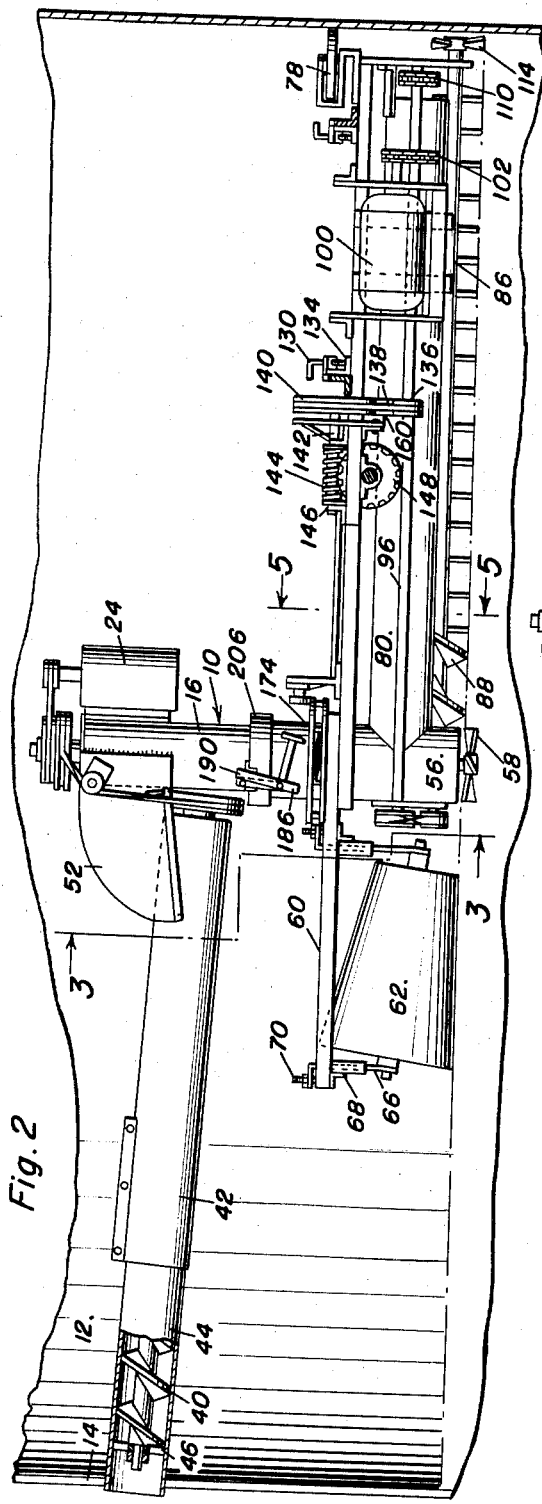
Figure 2 is a vertical section taken substantially along section line 2—2 of Figure 1 showing details of construction of the silo unloader.
Figure 3:
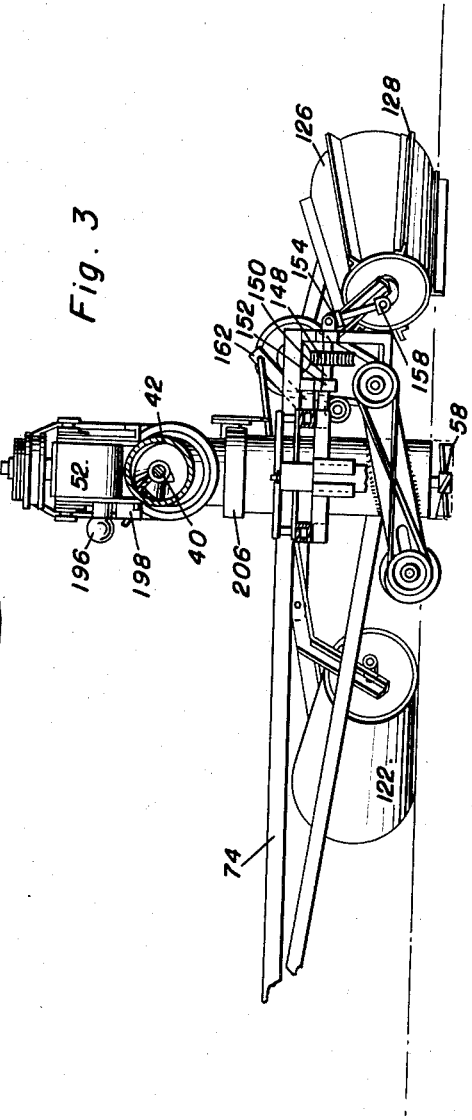
Figure 3 is a detailed vertical section taken substantially along section line 3—3 of Figure 2 showing the details of construction and structural arrangement of the silo unloader.

Referring now particularly to Figures 2 and 3, it will be seen that a pulley 136 is placed centrally on the drive shaft 96 and this pulley 136 drives a V-belt 138 which in turn drives a pulley 140 secured to a shaft 142 having a worm gear 144 thereon. The shaft 142 is journaled in suitable bearing blocks 146 as may be desirable. The worm gear 144 is in meshing engagement with a pinion gear 148 secured to a stub shaft 150 rotatably journaled in bearing blocks 152. The shaft 150 is connected to a suitable universal joint 154. The universal joint 154 is connected to a suitable drive shaft 156 that is telescopically adjustable and is connected to the axle 122 of roller 126 by a universal joint 158. The V-belt 138 is tensioned by a belt tightener 160 that is mounted on the end of a pivotally mounted actuating arm 162. The actuating arm 162 is connected to an actuating line 164 at its upper end and the line 164 is journaled over a pulley 166 and secured to one end of an elongated arm 168 which is pivotally mounted on an upstanding member 170 on the frame 60. The central portion of the arm 168 carries a roller 172 which projects outwardly therefrom and rests on the upper surface of a freely floating plate 174 which surrounds the tubular upstanding member 16. The plate 174 freely surrounds the tubular member 16 and this plate is provided with a plurality of apertures 176 and a depending right angular cam 178. A circular plate 180 similar to the plate 174 is rigidly secured to the frame 60 and includes an upstanding cam 182 which is similar to the depending cam 178. Normally the plate 180 rotates with the frame 60 and the plate 174 rotates with the plate 180 and a tension spring retains the idler pulley 160 into tight engagement with the belt 138 thereby driving the roller 126. A right angular member 184 is pivotally supported to the stationary tubular member 16 and an operating line 186 is secured to one portion of the right angular member 184 and an operating line 190 is secured to the other portion of the right angle arm 184 for pivoting the arm 184 about a pivot axis defined by the fastening bolt 192. The remote end of the right angle member 184 is provided with a pointed member 194 for selected engagement with the apertures 176 in the plate 174. When the lower operating line 186 is pulled, the pointed member 194 enters one of the apertures 176 thereby rendering the plate 174 stationary. Inasmuch as the plate 180 continues to rotate with the frame 60, the cam 182 will ride under the cam 178 thereby raising the plate 174 and raising the roller 172, the arm 168 and releasing the belt tightener 160 thereby permitting the driving roller 126 to stop. It will be seen that the beater 86 and the auger conveyor 82 will continue to operate thereby cleaning itself as desired. As will be seen, a suitable light 196 may be provided for illuminating the inside of the silo 12 and a switch 198 provided for supplying power to the motor 24 and a pair of rings 200 which are secured to the stationary tubular member 16 adjacent the lower end thereof and contacted by a pair of contacts 202 for transmitting electrical energy through a conductor 204 to the driving motor 100. It will be seen that a suitable shield 206 is provided for protecting the rings 200 and the contacts 202.

In operation, the motor 100 drives the driving roller 126 and the beater 86 and screw conveyor 82 in an obvious manner. The screw conveyor 82 transports the ensilage into the vertical tube 56 wherein the vertical conveyor 18 transports the ensilage up through the vertical tube 16 and out through the discharge tube 22 in an obvious manner. By operation of the remotely controlled lines 186 and 190, the operation of the driving roller 126 may be controlled as desired. It will be seen that as the ensilage level lowers, the silo unloader 10 of the present invention moves downwardly therewith.

By manipulating the members 130 and the screw threaded members 70, the vertical height of the frame may be adjusted thereby adjusting the amount of silage to be conveyed in a given amount of time thereby permitting the device to be used in various types of silage regardless of the compactness or consistency thereof. Obviously, various details of construction may be slightly modified and the device may be constructed of any readily obtainable materials which are generally corrosive resistant and long lasting.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A silo unloader comprising a rotatable frame adapted to be positioned in the interior of a silo, guide means on said frame for engaging the interior of the silo, means on said frame for supporting the frame on the upper surface of silage in the silo, said supporting means including a drive wheel, means on said frame for conveying silage to the center of the silo, and means extending from the frame for conveying silage from the center of the silo to the exterior thereof, said frame, guide means, supporting means and said conveying means for conveying silage moving downwardly in the silo in response to the lowering of the silage therein, said last named silage conveying means including a vertically disposed auger conveyor in a central tubular member on the frame, and a horizontally disposed auger conveyor assembly in communication with the upper end of the vertical conveyor, said horizontal conveyor assembly being secured to the tubular member and having an outlet to the outside of a silo, said frame supporting means also including a remotely actuated clutch for selectively actuating the driving wheel, said clutch being actuated by a cam on said rotating frame engaging a cam on a freely moving circular plate mounted on said tubular member, means carried by the tubular member for selectively non-rotatively and slidably locking said plate to said tubular member, a clutch operating arm mounted on said frame and engaging said plate, and a clutch actuating line connected to said arm, said plate moving vertically when the cams engage and move rotatively in relation to each other thereby causing vertical movement of the plate for lifting the arm and operating the clutch actuating line.

2. A silo unloader comprising a rotatable frame adapted to be positioned in the interior of a silo, guide means on said frame for engaging the interior of the silo, means on said frame for supporting the frame on the upper surface of silage in the silo, said supporting means including a drive wheel, means on said frame for conveying silage to the center of the silo, and means extending from the frame for conveying silage from the center of the silo to the exterior thereof, said frame, guide means, supporting means and said conveying means for conveying silage moving downwardly in the silo in response to the lowering of the silage therein, said last named silage conveying means including a vertically disposed auger conveyor in a central tubular member on the frame, and a horizontally disposed auger conveyor assembly in communication with the upper end of the vertical conveyor, said horizontal conveyor assembly being secured to the tubular member and having an outlet to the outside of a silo, said first named silage conveying means including an auger conveyor mounted horizontally on said frame and extending radially from said tubular member, a pronged beater for loosening silage mounted on the frame in advance of the horizontal conveyor, and power means connected with the beater and radial conveyor for driving said conveyor and beater.

3. The combination of claim 2 wherein, said frame supporting means and driving wheel are vertically adjustable for determining the rate of discharge of the silage.

4. A silo unloader comprising a frame for positioning within a silo, means mounted on said frame for rotatable supporting the frame on the silage within the silo, means mounted on the frame for engaging the interior of the silo for guiding the rotational movement of the frame, radially extending conveyor means supported from the frame for conveying silage to the center of the silo, conveyor means supported on the center of the frame for conveying silage upwardly and outwardly from the center of the silo and discharging the silage exteriorly of the silo, said frame supporting means including a plurality of silage engaging wheels journaled on the frame and including a driving wheel, power means mounted on the frame and drivingly connected with the radially extending conveyor means and the centrally supported conveyor means, power transfer means interconnecting the power means and the driving wheel, said power transfer means including a clutch mechanism for selectively interrupting the driving connection between the power means and driving wheel, an operating assembly for the clutch mechanism, said operating assembly being supported on the frame and connected with the clutch mechanism for operation thereof, said operating assembly including remotely extending control means for selectively controlling rotation of the frame during continuous operation of radially extending conveyor means and the centrally supported conveyor means thereby preventing clogging of the conveyor means.

References Cited in the file of this patent
UNITED STATES PATENTS

| | | |
|---|---|---|
| 1,479,990 | Keys | Jan. 8, 1924 |
| 2,518,601 | Cordis | Aug. 15, 1950 |
| 2,651,438 | Peterson | Sept. 8, 1953 |
| 2,677,474 | Long et al. | May 4, 1954 |